United States Patent [19]

Agrawal et al.

[11] Patent Number: 4,760,596
[45] Date of Patent: Jul. 26, 1988

[54] ADAPTIVE ECHO CANCELLATION AND EQUALIZATION SYSTEM SIGNAL PROCESSOR AND METHOD THEREFOR

[75] Inventors: Jagannath P. Agrawal, Overland Park, Kans.; Norman E. Heckman, Newton, Mass.

[73] Assignee: GTE Laboratories Incorporated, Waltham, Mass.

[21] Appl. No.: 832,975

[22] Filed: Feb. 25, 1986

[51] Int. Cl.[4] .............................................. H04B 3/23
[52] U.S. Cl. ..................................... 379/410; 370/32.1
[58] Field of Search ................. 370/32.1, 32; 379/406, 379/407, 410, 411; 375/14, 15; 333/18, 28

[56] References Cited

U.S. PATENT DOCUMENTS

| 3,974,449 | 8/1976 | Falconer | 325/321 |
| 4,074,086 | 2/1978 | Falconer et al. | 379/410 |
| 4,087,654 | 5/1978 | Mueller | 379/411 |
| 4,531,220 | 7/1985 | Brie et al. | 375/14 |
| 4,571,465 | 2/1986 | Brie et al. | 370/32.1 |
| 4,574,166 | 3/1986 | Gritton | 370/32.1 |
| 4,577,309 | 3/1986 | Barazeche et al. | 370/32 |

OTHER PUBLICATIONS

"Transmission Systems for Communications", Bell Telephone Laboratories, Inc. 1982, pp. 255-257.
"Transmission Systems for Communications", Bell Telephone Laboratories, Inc. 1982, pp. 849-855.
"Adaptive Equalization", S.U.H. Qureshi, *Proceedings of the IEEE*, vol. 73, No. 9, Sep. 1985, pp. 1349-1387.
"Adaptive Filters", Cowan et al., Prentice Hall, Inc., Englewood Cliffs, N.J. 1985, pp. 14-28 and 227.
"Application of Fast Kalman Estimation to Adaptive Equalization" Falconer et al., *IEEE Transactions on Communications*, Oct. 1978.
"Design Considerations for a 144 kbit/s Digital Transmission Unit for the Local Telephone Network", Gerwen et al., *IEEE Journal on Selected Areas in Communications*, Vol.SAC-2, No. 2, Mar. 1984.

Primary Examiner—Jin F. Ng
Assistant Examiner—Randall S. Vaas
Attorney, Agent, or Firm—Hamilton, Brook, Smith et al.

[57] ABSTRACT

A concurrent echo cancellation and channel equalization signal processor for hybrid full duplex communication, including a decision device and three transversal adaptive filters, in which the gain coefficients of the three transversal filters are adjusted in accordance with a fast Kalman algorithm to minimize the error between the estimated far end signal after it has passed through a hybrid (produced by summing the filter outputs) and the estimated received far end signal (produced by the decision device).

6 Claims, 1 Drawing Sheet

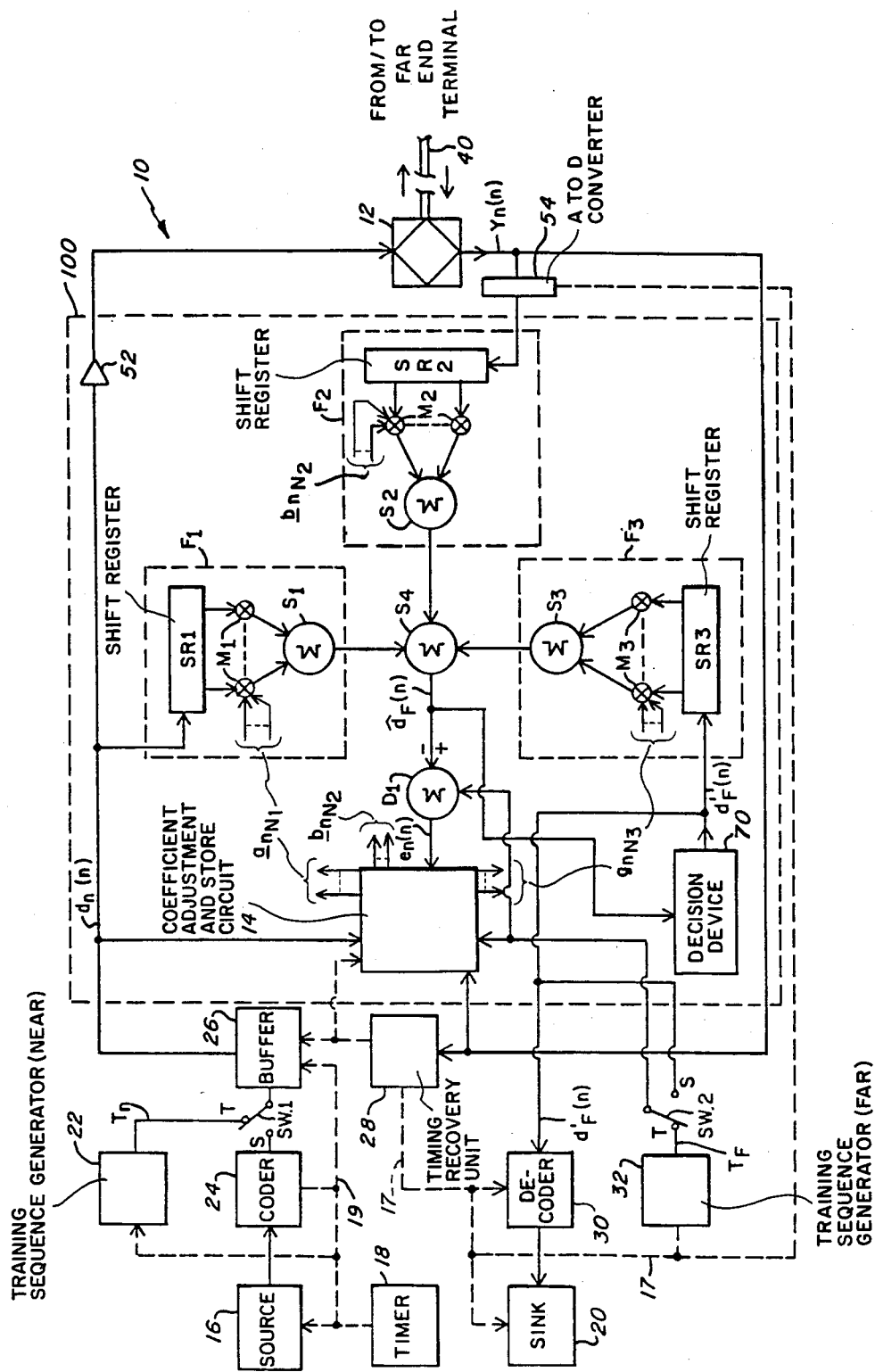

ADAPTIVE ECHO CANCELLATION AND EQUALIZATION SYSTEM SIGNAL PROCESSOR AND METHOD THEREFOR

DESCRIPTION

1. Technical Field

This invention is in the field of digital signal processors and, more particularly, relates to echo cancellation and channel equalization of data signals for communications over full-duplex transmission lines.

2. Background Art

Full-duplex digital data transmission requires the simultaneous bi-directional transmission of signals at full bandwidth over two wire transmission facilities. In such full-duplex transmission, it is necessary to separate the local or "near-end" transmitter from the usually weak signal received from the remote or "far-end" transmitter. Hybrid networks[1] employed at both the "near end" and "far end" are well known devices for achieving such separation or isolation. In theory, a hybrid network employs a terminating impedance equal to the impedance of the two wire line to achieve perfect separation. In practice, because of the complexity of the transmission line impedance and its frequency dependent nature, only an approximation is possible with passive circuits.

(1) "Transmission Systems for Communications", Bell Telephone Laboratories, Inc. 1982, pp. 255-257

Direct leakage across the local hybrid network, as well as delayed echoes caused by signals reflected from more distant impedance mismatches, cause transmitted signal components to interfere with and become mixed with the received distant signal.

Active circuits, called echo cancellation circuits or echo canceler, have been developed which compensate for such interference by estimating the interference (sometimes referred to as echo) and subtracting this estimate from the signal incoming from the local hybrid[2].

(2) "Transmission Systems for Communications", Bell Telephone Laboratories, Inc. 1982, pp. 849-855

An adaptive echo canceler for use in full duplex digital data transmission systems has been described by Mueller in U.S. Pat. No. 4,087,654 issued May 2, 1978. At the heart of Mueller's echo canceler is a linear sequential transversal filter. Such filters may be implemented in analog or digital form. An analog-type transversal filter is a delay line having a plurality of taps spaced at time intervals, or integral sub-multiples of that interval, corresponding to the reciprocal of the data symbol rate of the received signal. Current and past values of the input signal to be tapped delay line are weighted by coefficients (tap gains) and summed to produced an output. A digital-type transversal filter accepts samples of the input signal from an A/D converter, stores the samples in a bit shift register or in memory and the output samples are summed and weighted by digital computation.

The brief description above applies to echo cancellation techniques for removal of interference components mixed or superimposed upon the received signal. An additional problem in full duplex transmission communication is a type of distortion which affects the transmitted signal. This distortion is called Inter-Symbol Interference (sometimes referred to as ISI). This distortion results from the expansion of a pulse signal in the time domain as it passes through a band-limited channel. As a result, the received signal, at any given point in time, is not simply a reproduction of the transmitted signal but, rather, a combination of symbols which were transmitted at earlier points in time.

Expansion of the delayed pulse signal in the time domain results in undesirable precursor (leading) and postcursor (lagging) pulse distortion components. Cancellation of ISI has been achieved with two types of circuits; linear feed forward equalizer circuits and linear decision feedback equalizer circuits.

The linear feed forward equalizer utilizes a transversal filter to sample the current and past values of the received signal, which are linearly weighted and summed prior to decision being made as to the value of the received symbol. In the linear decision feedback equalizer[3], decision feedback is used to cancel the interference from symbols which have already been detected.

(3) "Adaptive Equalization", S. U. H. Qureshi, *Proceedings of the IEEE*, Vol. 73, No. 9, September 1985, pp. 1349-1387

Mueller, K. H. "Combining Echo Cancellation and Decision Feedback Equalization", *The Bell System Technical Journal*, Vol. 58, No. 2, February 1979 pp. 491-500), proposed a "combined" echo cancellation and decision feedback equalization system. In Mueller's "combined" system, a received incoming signal from a remote location is compensated for ISI by a decision feedback equalizer and simultaneously an undesired echo component of the transmitted signal, originating at the local source, is substantially canceled by an echo canceler.

The Mueller system contains two adaptive transversal filters; one is connected to the transmit data symbols and the other is connected to the received data symbols. The former functions as an echo canceler to mitigate the effects of hybrid mismatch. The latter filter is a decision feedback equalizer which compensates for ISI in the received far end signal due to linear distortion on the channel. The outputs of both filters are subtracted from the received signal and the resulting waveform is sampled to yield estimates of the far-end data. Error samples are generated and are used as a common control signal to adjust both the canceler and the equalizer transversal filter tap weights.

Echo cancellation and equalization processes occur simultaneously in the "combined" Mueller system described above. Also, the same error signal is used to drive respective coefficient adjustments. However, as pointed out by Mueller at page 9 of his above-referenced paper, only *postcursor* ISI is cancelled by this combined approach. Therefore, he suggests that linear equalizer taps be added, presumably to compensate for precursor ISI, but that such an addition drastically changes the joint convergence behavior of his preferred coefficient adjustment algorithm. It follows that without convergence a correct solution cannot be obtained.

Falconer et al., in U.S. Pat. No. 4,074,086 issued Feb. 14, 1978 suggests yet another "combined" approach. In the '086 patent, a forward equalizer and an echo canceler are combined so that forward equalization precedes echo cancellation and the tap gain coefficients of each equalizer structure are adjusted jointly from a common decision-directed mean square error minimization algorithm. Presumably, the '086 patent approach will improve the cancellation of precursive ISI but forward equalization alone is not an effective or efficient technique for postcursive ISI cancellation. This is for the reason that forward equalizers enhance channel noise because they introduce gain to combat amplitude losses[4].

[4] "Adaptive Filters", Cowan et al., Prentice Hall, Inc., Englewood Cliffs, N.J. 1985, pp. 15–27 and 227

Consequently, a need exists for an effective and efficient method and apparatus for echo cancellation and ISI cancellation of the precursive and postcursive distortion components which provides a suitable degree of convergence for effective utilization in a full duplex two wire digital communication system.

DISCLOSURE OF THE INVENTION

In the apparatus and method of the present invention a signal processor is disclosed comprising, in general, a cooperative arrangement of three adaptive finite impulse response (FIR) transversal filters, $F_1$, $F_2$ and $F_3$. One signal processor is utilized at the "near" or "local" end terminal and an identical one is utilized at the "far" or "remote" end terminal. The function of the filters is to compensate for, or cancel, undesirable components of the received signal, such as echo interference and intersymbol interference. The adaptive transversal filters $F_1$, $F_2$ and $F_3$ preferably comprise digital transversal filters in which the amplitude of the outputs may be adjusted by multiplying the output of each shift register by a coefficient value and then summing the output of the multipliers.

An initial training sequence is utilized in which the coefficients of the transversal filters are preliminarly adjusted using a known sequence of pulses transmitted by both the "near end" and "far end" terminals. After this training period, user data in the form of digital binary bit pulse signals is transmitted from the data sources at each end to the data sinks at the opposite end via a typical hybrid device at each end.

The signal processor at each end includes:

(a) a first adaptive transversal filter, $F_1$, which accepts at its input near-end data to be transmitted, $d_n(n)$, and produces at its output a digital signal which is a function of the near end data signal, as determined by the setting of the filter coefficients;

(b) a second adaptive transversal filter, $F_2$, which accepts at its input the received signal from the far-end terminal after it has passed through the near end hybrid, $y_n(n)$, and likewise produces, at its output, a digital signal which is a function of the received signal, as determined by the setting of the filter coefficients;

(c) a summing circuit for summing the tap outputs of filters $F_1$, $F_2$ and $F_3$ to produce an estimated value of the received signal $d_f(n)$;

(d) a decision device which accepts at its input the estimated value of the received signal $d_f(n)$ and produces an output signal $d'_f(n)$ indicative of the nearest code level of each data symbol estimate for $d_f(n)$ determined by a knowledge of the amplitude levels expected in the code being used;

(e) a third adaptive transversal filter $F_3$ which accepts at its input the output of the decision device $d'_f(n)$ and produces an output signal which is a function of that input signal;

(f) a difference circuit in which the $d_f(n)$ and $\hat{d}'_f(n)$ signals from the summing circuit and decision device, respectively, are subtracted to produce an error signal $e_n(n)$. Depending upon whether the processor is operating in the normal mode or training mode, respectively, the error signal $e_n(n)$ represents the difference between the estimated far end signal $d_f(n)$ and the decision signal $d'_f(n)$ or the far-end training data $T_f$; and (g) a coefficient adjustment and store circuit (CAS circuit) to which the error signal $e_n(n)$, hybrid output $y_n(n)$, near-end data to be transmitted $d_n(n)$, and either the decision output signal $d'_f(n)$ or far-end training data $T_f$ are coupled. The CAS circuit generates appropriate coefficient weighting signals for each filter, in accordance with a stored fast Kalman program to minimize the mean square error of the error signal $e_n(n)$.

Note that in the preceding and subsequent terminology, the following symbology will be employed:

"d" is used to represent samples of coded data symbols transmitted, the data may be of any type, i.e., voice or computer data, but is preferably in linear digitzed pulse form.

The subscript "n" is used to represent the "near" terminal, i.e., $d_n(n)$ represents near terminal data. Note that the subscript "n" in parenthesis refers to the nth sample of a sequence.

The subscript "f" refers to "far" terminal.

"y" is used to represent received signals emanating from the local hybrid.

A "prime" symbol "'", in d', denotes a decision as to the value of a data symbol.

A "carrot" or "hat" symbol "^" in $\hat{d}$, denotes an estimated data symbol.

BRIEF DESCRIPTION OF THE DRAWINGS

The sole drawing is a block diagram of a near end terminal in accordance with the invention.

BEST MODE OF CARRYING OUT THE INVENTION

The following detailed description, taken in connection with the drawing, describes the system implementation of the echo canceler/equalizer system 10 in accordance with the invention.

The drawing depicts one end of a full-duplex, two-wire digital data transmission system having a joint (a) echo canceler, (b) linear feed forward, and (c) decision-feedback equalizer. For purposes of simplicity, only the near end terminal is shown.

The symbology used to denote the signals at certain points in the drawing is summarized below:

$d_n(n)$ = sequence of near-end data symbols
$y_n(n)$ = sequence of near-end hybrid outputs
$d_f(n)$ = sequence of far-end data
$\hat{d}_f(n)$ = sequence of estimates of far-end data
$T_f$ = training data, as transmitted from far-end, a vector
$T_n$ = training data, as transmitted from near-end, a vector
$\bar{a}_{nN1}$ = tap coefficients $a_1$-$a_{N1}$, a vector
$\bar{b}_{nN2}$ = tap coefficients $b_1$-$b_{N2}$, a vector
$\bar{g}_{nN3}$ = tap coefficients $g_1$-$g_{N3}$, a vector
$d'_f(n)$ = sequence of decisions as to the value of far-end data.

It should be understood that the far end terminal is a replicate of the near end terminal. At the far end, the same process as described here is carried out with the subscripts "n" and "f" interchanged. The transmission medium is a single twisted pair 40.

I. TIMING

The near-end terminal 10 consists of a number of peripheral elements that are briefly described below. The far-end terminal also contains the same elements, which serve a similar function.

The near-end timing source 18 provides clock pulses for synchronization of the data source 16, coder 24, training sequence generator 22, and the buffer 26 over the dotted lines 19.

The echo canceler/equalizer subsystem 100 obtains an estimate of the far-end clock from the timing recovery unit 28. This timing is recovered from the received near-end signal $y_n(n)$ obtained from the near-end hybrid 12. The recovered timing clock is used to synchronize the decision device decoder 30, the data sink 20, buffer 26, subsystem 100, and the training sequence generator 32 as indicated by dotted lines 17.

II. TRAINING MODE OF OPERATION

There are two modes of operation for the system, training mode (T) and normal or standard mode (S). During system initialization, the training mode is used. In this mode, switches $SW_1$, $SW_2$ are in position "T", as shown. In the training mode, both terminals transmit training sequences $T_n$ and $T_f$ generated by respective training sequence generators 22 and 32, and initial adaptation of filters $F_1$, $F_2$ and $F_3$ takes place. The training sequences are of a predetermined fixed length and consist of predetermined samples of transmitted symbol trains. This mode may also be used from time-to-time if the error signal $e_n(n)$ becomes too large or the filters must be re-adapted.

In the training mode, a training sequence, $T_n$, is sent through the system to the far end. Also, at the near end, a replica of the training sequence expected from the far end, $T_f$, is supplied by training sequence generator 32 to $SW_2$ and then to the Coefficient Adjustment and Store circuit (CAS) 14 of the echo cancellation/equalization subsystem 100.

In the training mode, the algorithm stored in the CAS unit 14 adjusts the weighting of the transversal filters, $F_1$, $F_2$, $F_3$ to reduce the residual echo leakage through the hybrid 12 caused by the near-end training sequence $T_n$ and to restore the signal transmitted from the far end, and intended for recovery at the near end, to its original form, or as close to the transmitted training sequence as possible.

After a period of time, when the filters $F_1$, $F_2$ and $F_3$ are suitably adjusted and the error signal $e_n(n)$ is suitably small, the training mode is exited and standard operation is commenced.

III. STANDARD MODE OF OPERATION

During standard mode, the switches $SW_1$ and $SW_2$ are in the standard position, S, and user data is transmitted from the data sources 16 at each end to the data sinks 20 at the opposite end.

In standard mode, the near-end data source is encoded in a suitable way by the coder 24. Alternate Mark Inversion (AMI), Three Binary Two Ternary (3B2T), or some other suitable coding method and protocol may be used. The coded signal $d_n(n)$ is buffered in buffer 26 and transmitted to the hybrid 12 by a driver 52 which provides appropriate pulse shaping, voltage level, and impedance matching to the hybrid; and from hybrid 12 to the far end terminal via transmission line 40.

The coded signal $d_n(n)$ is also coupled to CAS ciruit 14 and to shift register SR1 of filter $F_1$. The analog signal received from the far end, after it passes through the hybrid 12, is labelled $y_n(n)$ and is coupled to timing recovery unit (TR) 28 and to SR2 after being converted to digital form in A/D converter 54. The digitized $y_n(n)$ signal is also coupled to shift register SR2 of filter $F_2$ of echo canceler/equalizer 100 where the distortion of the transmission through the line and the undesired echo of the near-end signal due to mismatches between the hybrid and the transmission line are ultimately removed.

The echo canceler/equalizer 100 operates on a digitized representation of the transmitted information while the hybrid 12 is typically realized as an analog circuit. Therefore, A/D converter 54 is required between the hybrid 12 and the filter $F_2$.

With the algorithm used in the preferred embodiment herein described, the CAS does not adjust the coefficients in the standard mode. Rather, the coefficients $a_{nN1}$, $b_{nN2}$, and $g_{nN3}$ are held at their last values, arrived at during the training mode.

In the standard mode of operation, the signal $e(n)$ may be used to determine the status or quality of the system performance.

IV. ECHO CANCELER/EQUALIZER

Referring now to the echo canceler/equalizer subsystem 100 shown in dotted lines, it may be seen that subsystem 100 generally comprises three transversal filters $F_1$, $F_2$ and $F_3$, with the outputs of each filter coupled to a mutual summing circuit $S_4$. Each filter consists of a shift register (SR1, SR2, SR3) which samples and stores the input signals at fixed intervals. Multipliers $M_1$, $M_2$, $M_3$ are provided for each shift register stage where gain coefficients, $a_{nN1}(n)$, $b_{nN2}(n)$, $g_{nN3}(n)$ generated by CAS 14, are multiplied by each shift register output.

The sum of each of the filter multipliers, $M_1$, $M_2$, and $M_3$, is taken in summers $S_1$, $S_2$ and $S_3$, respectively, and such sums are added together in summer $S_4$ to produce the estimated received signal at the near end $\hat{d}_f(n)$. The signal $\hat{d}_f(n)$ is fed to decision device 70. Device 70 may be in the form of a threshold detector for producing an output signal indicative of the nearest code level of each sample taken of $\hat{d}_f(n)$ to produce an output decision signal $d'_f(n)$ indicative of the value of the far end data signal. In the standard mode, and $d'_f(n)$ signal, or $T_f$ signal in the training mode, and $d_f(n)$ signal from Decision Device 70 or far-end Training Sequence generator 32 and Summer $S_4$, respectively, are coupled to Difference Circuit D1 to produce an error signal $e_n(n)$. Error signal $e_n(n)$ represents the difference between the estimate of the far end signal $\hat{d}_f(n)$ and the recovered decision as to the best value, $d'_f(n)$, or known value, $T_f$, of the far end signal received. The coefficient adjustment and store circuit CAS 14 adjusts the filter coefficients during the training mode so as to minimize this difference, in accordance with the algorithm described below.

V. COEFFICIENT ADJUSTMENT

The received signal $y_n(n)$ out of the hybrid 12 contains three components: echo from the near end data, a distorted form of far-end data caused by channel characteristics, and any other noise that may be present in the system. In order to extract the far end data $d_f(n)$, which in the training mode is a known training sequence, $T_f$, the same as that transmitted by the far end, or a good decision as to the value of the far end data $d'_f(n)$, a filter must be provided with three inputs. These inputs are near end data transmitted $d_n(n)$, far end data decisions received $d'_f(n)$, and the received data $y_n(n)$.

Kalman filter theory[4] enables one to model an optimal and efficient filter, called a Kalman filter, which provides a good estimate of the desired signal using very short training sequences. A disadvantage of the Kalman algorithm is its computational complexity. However, the fast Kalman algorithm developed by Falconer[5] using the shifting property of the input vectors, largely overcomes this disadvantage.

(4) "Adaptive Filters", Cowan et al., Prentice Hall, Inc., Englewood Cliffs, N.J. 1985, pp. 15-27 and 227
(5) "Application of Fast Kalman Estimation to Adaptive Equalization", Falconer et al., *IEEE Transactions on Communications*, October 1978, pp. 1439-1446.

The remainder of this description is organized as follows: First, the Kalman filter concept is introduced in the context of the adaptive filtering required for the method and apparatus of this invention. Second, the use of the fast Kalman technique is developed. Thirdly, the details of the preferred embodiment of the algorithm used to perform coefficient adjustment are given.

(a) Kalman Filter Technique

The adaptive filtering terminology required to describe the overall operation of the CAS, the error criteria used, and the basis for the Kalman filtering technique, will now be described.

First consider an N-point state vector which contains a copy of the contents of the shift registers SR1, SR2, SR3. The N-point state vector at time n is $x_n(n)$, as follows:

$$x_N^T(n) = [d_{n1}, d_{n2}, \ldots, d_{nN_1}, y_{n_1}, y_{n_2}, \ldots, y_{nN_2}, d'_{f_1}, d'_{f_2}, \ldots, d'_{fN_3}] \quad (1)$$

where $d_{n1}, d_{n2}, \ldots, d_{nN_1}$ are the last $N_1$ data symbols transmitted from the near end; $y_{n1}, y_{n2}, \ldots, y_{nN_2}$ are the last $N_2$ data samples received; and $d'_{f_1}, d'_{f_2}, \ldots, d'_{fN_3}$ are the last $N_3$ decisions on data symbols transmitted from the far end; $N = N_1 + N_2 + N_3$; and T indicates the transpose operation. Note that the state vector change as the shift registers SR1–SR3 are shifted at each sampling interval.

Also consider a vector $C_N^T(n)$ which contains the coefficients that are generated.

The coefficient vector $C_N(n-1)$ corresponding to the state vector is defined as:

$$C_N^T(n-1) = [\underline{a}_{nN_1}(n-1); \underline{b}_{nN_2}(n-1); \underline{g}_{nN_3}(n-1)] \quad (2)$$

or $$C_N^T(n-1) = [a_{n1}, a_{n2} \ldots a_{nN_1}, b_{n1} b_{n2} \ldots b_{nN_2} g_{n1} g_{n2} \ldots g_{nN_3}]$$

Note: subscript "N" refers to the length of the associated "N" point vector and subscript "T" refers to the transpose operation. The coefficients $C_N(n-1)$ are used at time n to determine the estimate of $d_f(n)$. Based on the result, the coefficients are recomputed to obtain $C_N(n)$ to be used at time $(n+1)$. At the end of the training period, the recomputation of coefficients is stopped, and they are fixed at the last set of values.

The estimated value of the far end signal is $\hat{d}_f(n)$, which may be written in terms of coefficients as:

$$\hat{d}_f(n) = C_N^T(n-1)x_N(n) \quad (3)$$

This signal, $\hat{d}_f(n)$, is produced by summer 54 and comprises the summation of outputs of the external filters F1, F2 and F3. If the error in this estimate (i.e., deviation of the estimated value from its actual value) is $e_n(n)$, then $$e_n(n) = d_f(n) - C_N^T(n-1)x_N(n) \quad (4)$$

(which is the output of difference circuit D1; where $d_f(n)$ is represented by either a known training sequency $T_f$, or good decisions as to the value of the transmitted sequence $d'_f(n)$).

The criteria used in CAS 14 to recompute the coefficient vector $C_N(n)$ is that it must, at time n, minimize the cumulative squared error, which is given by:

$$E = \sum_{k=1}^{n} e_n^2(k) = \sum_{k=1}^{n} [d_f(k) - C_N^T(n) x_N(k)]^2 \quad (5)$$

The cumulative squared error at time n is defined as the sum of the squared errors at times 1 to n where the error at each time is determined using the coefficient vector $C_N(n)$ obtained as follows:

To determine $C_N(n)$, which minimizes E above, Equation 5 is differentiated with regard to $C_N^T(n)$ and equated to zero. Then:

$$\frac{\partial E}{C_N^T} = 0 =$$

$$\sum_{k=1}^{n} \left\{ 2[d_f(k) - C_N^T(n)x_N(k)] \left( \frac{\partial E}{C_N^T} [d_f(k) - C_N^T(n)x_N(k)] \right) \right\}$$

which, when simplified is:

$$\sum_{k=1}^{n} [d_f(k) - C_N^T(n)x_N(k)]x_N^T(k) = 0 \quad (6)$$

or $$\sum_{k=1}^{n} [d(k)x_N^T(k)] - C_N^T(n) \sum_{k=1}^{n} [x_N(k)x_N^T(k)] = 0$$

Let, at time n, the cross-correlation matrix for $d_f(k)$ and $x_N(k)$ be $P_N(n)$ and the autocorrelation matrix for $x_N(k)$ be $R_{NN}(n)$. Then, expression (6) may be written as:

$$P_N^T(n) = C_N^T(n)R_{NN}^T(n)$$

or $$P_N(n) = R_{NN}(n)C_N(n)$$

or $$R_{NN}^{-1}(n)P_N(n) = C_N(n); \quad (7)$$

therefore $R_{NN}(n)$ can be written as:

$$R_{NN}(n) = \sum_{k=1}^{n} x_N(k) x_N^T(k) + \delta R_{NN}(k)$$

where $\delta > 0$ and is very small to ensure nonsingularity of $R_{NN}(n)$. Expression (7) is the well-known Weiner-Hopf equation. According to the Kalman algorithm, when the above criteria is applied and $C_N(n) = R_{NN}^{-1}(n)P_N(n)$, $C_N(n)$ can be determined recursively as follows:

$$C_N(n) = C_N(n-1) + k_N(n)e(n) \quad (8)$$

where $k_N(n)$ is the Kalman gain vector at time n and is given by:

$$k_N(n) = R_{NN}^{-1}(n) x_N(n) \quad (9)$$

Hence, in order to determine the optimal set of filter coefficients for filters F1, F2 and F3, one could determine $R_{NN}^{-1}(n)$, $R_{NN}(n)$, the Kalman gain vector $k_N(n)$, and then $C_N(n)$ from expression (8). The computation time available is the time between the two data samples.

(b) Fast Kalman Technique

In order to minimize computation to determine $k_N(n)$, we prefer to use the fast Kalman algorithm development by Falconer, as follows:

At every sampling instant, three new elements (namely, $d_{no}$, $y_{no}$, and $d'_{fo}$) become available to the CAS 14 and SR1, SR2, and SR3. This newest information is incorporated in the input vector $x_N(n+1)$ by shifting in $d_{no}$, $y_{no}$, and $d'_{fo}$ and shifting out the oldest information $d_{nN1}$, $y_{nN2}$, and $d'_{fN3}$ from the input vector $x_N(n)$. Taking advantage of this shifting, the Kalman gain vector can be updated every time rather than recomputed from the beginning.

To do this, we define a vector $\xi_3(n)$, containing the newly arrived elements at shift registers SR1, SR2, and SR3 at time (n) and a vector $P_3(n)$, which contains the oldest elements which are to be shifted out of shift registers at time (n+1) as follows:

$$\xi_3^T(n) = [d_{no}(n), y_{no}(n), d'_{fo}(n)],$$

$$\rho_3^T(n) = [d_{nN1}(n), y_{nN2}(n), d'_{fN3}(n)].$$

We also define an extended input vector $x_M(n)$, which contains all the new, as well as the old, elements at time n is defined as:

$$x_M^T(n) = [d_{n0}, d_{n1}, d_{n2}, \ldots, d_{nN1}; y_{n0}, y_{n1}, y_{n2}, \ldots, y_{nN2}; d'_{f0}, d'_{f1}, d'_{f2}, \ldots, d'_{fN3}],$$

where $M = N+3$. Then the vectors $\xi_3(n)$, $\rho_3(n)$, $x_N(n)$, and $x_M(n)$ can be related as follows:

$$S_{MM} x_M(n) = \begin{bmatrix} \xi_3(n) \\ x_N(n) \end{bmatrix} \text{ and } Q_{MM} x_M(n) = \begin{bmatrix} x_N(n+1) \\ \rho_3(n) \end{bmatrix}$$

where $S_{MM}$ and $Q_{MM}$ are the permutation matrices, each row and column of which contains a single "1" and have the following property:

$$S_{MM}^{-1} = S_{MM}^T \text{ and } Q_{MM}^{-1} = Q_{MM}^T$$

The predicted value of the vector $\xi_3(n)$ is based on the input vector $x_N(n)$. The predicted value of $\xi_3(n)$ may thus be written as follows:

$$PRED [\xi_3(n)] = -A_{Nx3}^T(n-1) x_N(n),$$

where $-A_{Nx3}(n-1)$ is an Nx3 prediction coefficient matrix. The error vector $\epsilon_3(n)$ is then given by:

$$\epsilon_3(n) = \xi_3(n) - [-A_{Nx3}^T(n-1) x_N(n)] \quad (10)$$

The coefficient matrix $-A_{Nx3}(n)$ is chosen to minimize the cumulative squared error:

$$\sum_{k=1}^{n} \epsilon_3^2(k) = \sum_{k=1}^{n} [\xi_3(k) + A_{Nx3}^T(n) x_N(k)]^2 \quad (11)$$

As in the case of expression (5), the solution to expression (11) is the well-known Wiener-Hopf equation given by:

$$A_{Nx3}(n) = R_{NN}^{-1}(n) P1_{Nx3}(n)$$

where $P1_{Nx3}(n)$ is the transpose of the cross-correlation matrix for $\xi_3(n)$ and $x_N(k)$. Then, $A_{Nx3}(n)$ can be determined recursively as was $C_N(n)$ in expression (8) as follows:

$$A_{Nx3}(n) = A_{Nx3}(n-1) - k_N(n) \epsilon_3^T(n) \quad (12)$$

Once $A_{Nx3}(n)$ has been determined, one may obtain a new estimate of $\epsilon_3(n)$ using the new prediction coefficient matrix $A_{Nx3}(n)$. The new error $\epsilon_3'(n)$ can be written as:

$$\epsilon_3'(n) = \xi_3(n) + A_{Nx3}^T(n) x_N(n) \quad (13)$$

In a similar manner, a backward prediction coefficient matrix $-D_{Nx3}(n)$ can be defined to estimate the vector $\rho_3(n)$ using the new input vector $x_N(n)$. The error vector $\eta_3(n)$ in this case may be written as:

$$\eta_3(n) = \rho_3(n) - [-D_{Nx3}^T(n-1) x_N(n)] \quad (14)$$

Then, the corresponding recursive expression, similar to the previous case, for $D_{Nx3}(n)$ may be written as:

$$D_{Nx3}(n) = D_{Nx3}(n-1) - k_N(n) \eta_3^T(n) \quad (15)$$

Solving the matrix equations (10) and (12) through (15), one obtains an expression for $k_N(n)$, which requires a much smaller number of computations compared to direct computation of $k_N(n)$ from expression (9).

(c) Preferred Algorithm

The preferred embodiment of the coefficient adjustment algorithm will now be described.

The fast Kalman filter within the CAS 14 comprises a plurality of stored variables, vectors and matrices, described in equations i-xi below, which are used in the computation of the weighting coefficients.

The inputs to the CAS 14 consist of the vector $\xi_3(n)$, made up of the newly arrived elements at time (n) of d(n), $Y_n(n)$ and $d'_f(n)$ (or $T_f$ during the training sequence), as defined earlier, and the error signal $e_n(n)$ produced by the difference circuit D1. Note that throughout this description, the input signal coming from switch SW2 will be referred to as $d'_f(n)$.

The output of the CAS 14 is the coefficient vector $C_N(n)$ which contains the coefficients $a_{nN1}$, $b_{nN2}$ and $g_{nN3}$ to be sent to filters F1, F2 and F3, respectively.

The steps involved in recursive computation of the Kalman gain vector $k_N(n)$, and the new set of filter coefficients $C_N(n)$, based on the above treatment, are presented below in a systematic manner.

Step 1. Initialize elements of all vectors/matrices to zero and set $\delta > 0$ to a very small value. For example $\delta = 1 \times 10^{-6}$.

Step 2. Determine error $\epsilon_3(n)$ in forward prediction from the following expression:

$$\epsilon_3(n) = \xi_3(n) + A_{Nx3}^T(n) x_N(n) \quad (i)$$

Step 3. Determine the new forward prediction coefficient matrix $A_{Nx3}(n)$ using the value of $\epsilon_3(n)$ from expression (i) as follows:

$$A_{Nx3}(n) = A_{Nx3}(n-1) - k_N(n)\epsilon_3^T(n) \qquad \text{(ii)}$$

Step 4. Using new coefficients $A_{Nx3}(n)$ from expression (ii), predict $\xi_3(n)$ again and determine new error $\epsilon_3(n)$ as follows:

$$\epsilon'_3(n) = \xi_3(n) + A_{Nx3}^T(n)x_N(n) \qquad \text{(iii)}$$

Step 5. Determine a 3x3 covariance matrix $E_{3x3}(n)$ for the two prediction errors $\epsilon'_3(n)$ and $\epsilon_3(n)$ as follows:

$$E_{3\times 3}(n) = \sum_{k=1}^{n} \epsilon'_3(k)\epsilon_3^T(k), \text{ letting } E_{3\times 3}(0) = \delta I_{3\times 3}$$

$$= \sum_{k=1}^{n-1} \epsilon'_3(k)\epsilon_3^T(k) + \epsilon'_3(n)\epsilon_3^T(n)$$

where $I_{3x3}$ is a 3x3 identity matrix, or $$E_{3x3}(n) = E_{3x3}(n-1) + \epsilon'_3(n)\epsilon_3^T(n) \qquad \text{(iv)}$$

[Hence, $E_{3x3}(n)$ can be computed recursively.]

Step 6. Determine a new vector $k_M(n)$ using the computed results in expressions (i) through (iv), as follows:

$$k_M(n) = S_{MM}^T \left[ \frac{E_{3\times 3}^{-1}(n)\epsilon'_3(n)}{k_N(n) + A_{N\times 3}(n) E_{3\times 3}^{-1}(n)\epsilon'(n)} \right] \qquad \text{(v)}$$

The elements above the dotted line account for the first three elements in $k_M(n)$, and those below the dotted line, for the remaining N elements in $k_M(n)$.

Step 7. Rearrange elements of vector $k_M(n)$ as follows:

$$Q_{MM} k_M(n) = \left[ \frac{m_N(n)}{\mu_3(n)} \right] \qquad \text{(vi)}$$

Step 8. Perform prediction of the elements in vector $\rho_3(n)$ using the backward prediction coefficient matrix and thereby determine the error vector $\eta_3(n)$ as follows:

$$\eta_3(n) = \rho_3(n) + D_{Nx3}^T(n-1)x_N(n+1) \qquad \text{(vii)}$$

Step 9. Using the computed results from expressions (vi) and (vii), determine the new backward prediction coefficient matrix $D_{Nx3}(n)$ as follows:

$$D_{Nx3}(n) = [D_{Nx3}(n-1) - m_N(n)\eta_3^T(n)][I_{3x3} - \mu_3(n)\eta_3^T(n)]^{-1} \qquad \text{(viii)}$$

Step 10. Determine the new Kalman gain vector $k_N(n)$ as follows:

$$k_N(n+1) = m_N(n) - D_{Nx3}(n)\mu_3(n) \qquad \text{(ix)}$$

Step 11. Estimate value of the desired data symbol $d_f(n)$ and the error in estimation as follows:

$$e_n(n+1) = d'_f(n+1) - C_N^T(n)x_N(n+1) \qquad \text{(x)}$$

Note that the calculation in step (11) is performed external to the coefficient adjustment and store (CAS) by the transversal filters and summing and differencing circuits and that in the training mode $T_F$ is substituted for $d'_f(n)$.

Step 12. Using the values of $k_N(n)$ from expression (ix) and that of $e_n(n)$ from expression (x), determine the new coefficient vector $C_n(n)$ as follows:

$$C_N(n+1) = C_N(n) + k_N(n+1)e_n(n+1) \qquad \text{(xi)}$$

to produce the output:

$$C_N^T(n+1) = [\underline{a}_{nN1}(n+1): \underline{b}_{nN2}(n+1): \underline{g}_{nN3}(n+1)]$$

After Step 12, start next iteration going back to Step 2.

EQUIVALENTS

While the above described embodiment is preferred, other configurations will be readily apparent to those skilled in the art and thus, the invention is only to be limited in scope by the language of the following claims and equivalents.

We claim:

1. A concurrent echo cancellation and channel equalization signal processor for hybrid full duplex communication over a medium of far end data symbols $d_f(n)$ and near end data symbols $d_n(n)$ between two hybrids, one hybrid being located at the far end of the medium, the other hybrid located at the near end, comprising at the near end:
   (a) a decision device for producing an output decision signal indicative of the nearest code level of each far end data symbol $\hat{d}_f(n)$ after passing through the hybrids, and
   (b) three transversal adaptive filters, each said filters including means for sampling an input signal applied thereto, means for delaying said applied signal, and means for amplifying said applied signal in accordance with variable gain coefficients and generating an output signal, and
   (c) summing means for summing the output signals of the filters to produce an estimated value signal proportional to the far end data symbols after passing through the hybrids; and
   (d) means for adjusting the gain coefficients of the three transversal filters in accordance with an algorithm adapted to minimize the error between the estimated value signal and the decision signal and wherein the input signal to one said filter is the near end data symbols, the input signal to another said filter is the far end data symbols after passing through the hybrids, and the input signal to the remaining filter is the decision signal.

2. A signal processor for full duplex digital data transmission over a transmission medium between a near end and far end location having a hybrid circuit at each end, and wherein $d_n(n)$ is the data transmitted from the near end which data passes through each of said hybrid circuit and $\hat{d}_f(n)$ is the data transmitted from the far end, and $y_n(n)$ is the data from the far end after it passes through each said hybrid circuit, comprising:
   (a) three adaptive transversal filter means $F_1$, $F_2$ and $F_3$, each including:
      (i) adjustable weighting coefficients;
      (ii) delay and weighting means in which an input signal may be sampled and delayed and such delayed samples weighted in accordance with said weighting coefficients and (iii) filter summing means for summing and delayed weighted samples;

(b) first coupling means for coupling, as input signals, the $d_n(n)$ data to the delay means of filter summing means $F_1$, and the $y_n(n)$ data to the delay means of filter summing means $F_2$;

(c) additional summing means for summing the summed samples of each filter summing means to produce an output estimate signal $\hat{d}_f(n)$ representing an estimate of the far end data;

(d) a decision device the input terminal of which is coupled to the additional summing means for accepting the estimate signal $\hat{d}_f(n)$ from the additional summing means and producing an output signal, $\hat{d}'_f(n)$, which signal comprises a decision as to the value of the far end transmitted signal $\hat{d}_f(n)$;

(e) second coupling means for connecting the estimate signal $\hat{d}_f(n)$ to the input of said decision device and for connecting the output of the decision device $\hat{d}'_f(n)$, as the input signal, to the delay means of filter summing means $F_3$;

(f) a training sequence generator for generating at the near end a far end trailing sequence output signal $T_F$;

(g) a difference circuit having one input terminal coupled to the output signal of said additional summing means and a second input terminal adapted to be coupled to either (i) the output signal of said decision device or (ii) to the output signal of said training sequence generator to produce an error signal $e_n(n)$; and (h) a coefficient adjustment circuit for adjusting said weighting coefficients for each filter $F_1$, $F_2$, $F_3$, in accordance with a program stored in said coefficient adjustment circuit, which program is responsive to said error signal $e_n(n)$, said near end transmitted data $d_n(n)$, said far end data after passing through the hybrids, and said output of said decision device or said far end training sequence output signal.

3. The process of claim 2 wherein the program stored in the coefficient adjustment circuit includes a fast Kalman algorithm.

4. The processor of claim 2 wherein said error signal represents the difference between the estimate signal and a decision as to the best value of a known value of the far end signal received.

5. A method of processing signals for full duplex digital data transmission over a transmission medium between a near end and far end location having hybrid circuits at each end, and wherein a training sequence signal is generated at the near end and also at the far end, and $d_n(n)$ is the data transmitted from the near end which data passes through said hybrid circuits and $d_f(n)$ is the data transmitted from the far end which data also passes through said hybrid circuits, and $y_n(n)$ is the data from the far end after it passes through said hybrid circuits and wherein three adaptive transversal filter means, $F_1$, $F_2$ and $F_3$, are provided, each filter means including:

(i) delay means and weighting means in which an input signal is sampled and delayed and such delayed samples weighted in accordance with adjustable weighting coefficients coupled to each filter means; and (ii) summing means for summing the delayed weighted samples;

said method comprising the steps of:

(a) coupling the $d_n(n)$ data as the input signal to the delay means of filter means $F_1$, and the $y_n(n)$ data as the input signal to the delay means of filter means $F_2$;

(b) summing the summed samples of each filter means to produce an estimate signal $d_f(n)$ representing an estimate of the far end data;

producing a decision signal $d'_f(n)$ from said estimate signal, which represents a decision as to the value of the far end transmitted signal $d_f(n)$ and coupling decision signal $d'f(n)$ as the input signal to the delay means of filter $F_3$;

(d) generating a training sequence signal $T_F$ at the near end which sequence signal is a replica of a training sequence generated at the far end;

(e) subtracting the estimate signal $d_f(n)$ from either the decision signal $d'_f(n)$ or the training sequence signal $T_F$ to produce an error signal $e_n(n)$; and (f) generating separate values of said weighting coefficients for each filter $F_1$, $F_2$, $F_3$, in accordance with a stored program responsive to said error signal $e_n(n)$, said near end transmitted data $d_n(n)$, received distored hybrid output data $y_n(n)$, and decision signal $d'_f(n)$ or the training sequence signal $T_F$.

6. The method of claim 5 wherein the weighting coefficients are generated by stored vectors/matrices in said program as follows:

Step 1. Initialize elements of all vectors/matrices to zero and set $\delta > 0$ to a very small value;

Step 2. Determine error $\epsilon_3(n)$ in forward prediction from the following expression:

$$\epsilon_3(n) = \xi_3(n) + A_{Nx3}^T(n[-1])x_N(n) \qquad \text{(i)}$$

Step 3. Determine the new forward prediction coefficient matrix $A_{Nx3}(n)$ using the value of $\epsilon_3(n)$ from expression (i) as follows:

$$A_{Nx3}(n) = A_{Nx3}(n-1) - k_N(n)\epsilon_3^T(n) \qquad \text{(ii)}$$

Step 4. Using new coefficients $A_{Nx3}(n)$ from expression (ii), predict $\epsilon_3(n)$ again and determine new error $\epsilon'_3(n)$ as follows:

$$\epsilon'_3(n) = \xi_3(n) + A_{Nx3}^T(n)x_N(n) \qquad \text{(iii)}$$

Step 5. Determine a 3x3 covariance matrix $E_{3x3}(n)$ for the two prediction errors $\epsilon'_3(n)$ and $\epsilon_3(n)$ as follows:

$$E_{3\times 3}(n) = \sum_{k=1}^{n} \epsilon'_3(k)\epsilon_3^T(k), \text{ letting } E_{3\times 3}(0) = \delta I_{3\times 3}$$

$$= \sum_{k=1}^{n-1} \epsilon'_3(k)\epsilon_3^T(k) + \epsilon'_3(n)\epsilon_3^T(n)$$

where $I_{3x3}$ is a 3x3 identity matrix, or:

$$E_{3x3}(n) = E_{3x3}(n-1) + \epsilon'_3(n)\epsilon_3^T(n) \qquad \text{(iv)}$$

Step 6. Determine a new vector $k_M(n)$ using the computed results in expressions (i) through (iv), as follows:

$$k_M(n) = S_{MM}^T \left[ \frac{E_{3\times3}^{-1}(n)\epsilon'_3(n)}{k_N(n) + A_{N\times3}(n) E_{3\times3}^{-1}(n)\epsilon'_3(n)} \right] \quad \text{(v)}$$

Step 7. Rearrange elements of vector $k_M(n)$ as follows:

$$Q_{MM} k_M(n) = \left[ \frac{m_N(n)}{\mu_3(n)} \right] \quad \text{(vi)}$$

Step 8. Perform prediction of the elements in vector $\rho_3(n)$ using the backward prediction coefficient matrix and thereby determine the error vector $\eta_3(n)$ as follows:

$$\eta_3(n) = \rho_3(n) + D_{Nx3}^T(n-1)x_N(n) \quad \text{(vii)}$$

Step 9. Using the computed results from expressions (vi) and (vii), determine the new backward prediction coefficient matrix $D_{Nx3}(n)$ as follows:

$$D_{Nx3}(n) = [D_{Nx3}(n-1) - m_N(n)\eta_3^T(n)][I_{3\times3} - \mu_3(n)\eta_3^T(n)]^{-1} \quad \text{(viii)}$$

Step 10. Determine the new Kalman gain vector $k_N(n)$ as follows:

$$k_N(n+1) = m_N(n) - D_{Nx3}(n)\mu_3(n) \quad \text{(ix)}$$

Step 11. Estimate value of the desired data symbol $d_f(n)$ and the error in estimation as follows:

$$e_n(n+1) = d'_f(n+1) - C_N^T(n)x_N(n+1) \quad \text{(x)}$$

Step 12. Using the values of $k_N(n)$ from expression (ix) and that of $e_n(n)$ from expression (x), determine the new coefficient vector $C_N(n)$ as follows:

$$C_N(n+1) = C_N(n) + k_N(n+1)e_n(n+1); \quad \text{(xi)}$$

wherein:

$\delta$—Delta, a numerically small invariant constant used in the initization of matrices, $\epsilon_3(n)$—Epsilon, the forward prediction error matrix, a row vector of order 3, defined in eq. (i), $\xi_3(n)$—Xi, the input vector for the coefficient weighting process, a column vector of order 3, $\xi_3(n) = [d_{n0}(n), y_{n0}(n), d'_{f0}(n)]$, where the contents of $\xi_3$ are the newly arrived elements about to be entered into shift registers, SR1, SR2, and SR3 respectively, $A_{Nx3}(n)$—The forward prediction matrix of order N rows and 3 columns, defined in eq. (ii), $x_N(n)$—The N-point state column vector made up of a copy of the contents of the shiftregisters, SR1, SR2, and SR3, respectively:

$x^T_N(n) = [d_{n1}, d_{n2}, \ldots d_{nN1}, y_{n1}, y_{n2}, \ldots y_{nN2}, d'_{f1}, d'_{f2}, \ldots d'_{fN3}],$ where N, the length of the vector, is equal to $N_1 + N_2 + N_3$, $k_N(n)$—The N-point Kalman gain vector, defined in eq. (ix), $\epsilon'_3(n)$—Epsilon prime, a new forward prediction error matrix, a row vector of order 3, as defined in eq. (iii), $E_{3\times3}(n)$—Covariance matrix for prediction errors, of order 3 rows and 3 columns, defined in Step 5 and eq. (iv), $I_{3\times3}$—A well known identity matrix of order 3 rows and 3 columns. This matrix is invariant and not a function of discrete time, $k_M(n)$—An M-point column vector of length $M = N + 3$, defined in eq. (v), $x_M(n)$—An M-point extended state column vector made up of a copy of the cntents of the shift registers SR1, SR2, and SR3, respectively as well as the newly arriving inputs, not yet shifted into the registers (denoted by the elements with a zero subscript):

$x^T_M(n) = [d_{n0}, d_{n1}, d_{n2}, \ldots d_{nN1}, y_{n0}, y_{n1}, y_{n2}, \ldots y_{nN2}, d'_{f0}, d'_{f1}, d'_{f2}, \ldots d'_{fN3}],$ where M, the length of the vector, is equal to $N_1 + N_2 + N_3 + 3$, $\rho_3(n)$—Rho, the leaving vector, an order 3 column vector. $\rho_3(n) = [d_{N1}(n), y_{N2}(n), d'_{N3}(n)]$, the contents of $\rho_3$ are the oldest information in the state vector, which is about to be shifted out of the shift registers, SR1, SR2, and SR3 respectively, $S_{MM}$—A permutation matrix of order M rows and M columns. Each row and column of which contains a single "1", all the rest of its entries are zero. This matrix is invariant and not a function of discrete time. The matrix has the following property: $S^{-1}_{MM} = S^T_{MM}$, The $S_{MM}$ matrix is defined by the following relationship:

$$S_{MM} x_M(n) = \left[ \frac{\xi_3(n)}{x_N(n)} \right],$$

The permutation performed here is the rearrangement of elements so that the newly arrived elements of are placed at the top, $Q_{MM}$—A permutation matrix of order M rows and M columns. Each row and column of which contains a single "1", all the rest of its entries are zero. This matrix is invariant and not a function of discrete time. The matrix has the following property: $Q^{-1}_{MM} = Q^T_{MM}$, The $Q_{MM}$ matrix is defined by the following relationship:

$$Q_{MM} x_M(n) = \left[ \frac{x_N(n+1)}{\rho_3(n)} \right],$$

The permutation performed here is the rearrangement of elements so that the oldest elements, those about to be shifted out, are placed at the bottom, $m_N(n)$—A column vector of length N formed from elements of $k_M$ as defined in eq. (vi), $\mu_3(n)$—A column vector of length 3 containing the oldest elements of the $k_M$ vector defined in eq. (vi), $D_{Nx3}(n)$—A backward coefficient prediction matrix of order N by 3, as defined in eq. (viii), $\eta_3(n)$—An error vector of length 3, defined in eq. (vii), $e_n(n)$—Error estimation, a single value, defined in Step 11, eq. (x), $d'_f(n)$—The output signal which represents a decision as to the value of the far end transmitted signal, $d_f(n)$, $C_N(n)$—Coefficient column vector of length N containing the weighting factors for the transversal filters, F1, F2, and F3, as defined in Step 12 and eq. (xi).

* * * * *

UNITED STATES PATENT AND TRADEMARK OFFICE
CERTIFICATE OF CORRECTION

PATENT NO. : 4,760,596
DATED : July 26, 1988
INVENTOR(S) : Jagannath P. Agrawal and Norman E. Heckman Page 1 of 2

It is certified that error appears in the above—identified patent and that said Letters Patent is hereby corrected as shown below:

Col. 12, line 36, second occurrence, delete "filters" and insert ---filter---.

Col. 12, line 60, after "each" delete "of".

Col. 13, line 3, delete "and" and insert ---the---.

Col. 13, line 25, delete "trailing" and insert ---training---.

Col. 13, line 49, first occurrence, delete "of" and insert ---or---.

Col. 14, line 11, insert ---(c)--- at beginning of sentence.

Col. 14, line 26, delete "distored" and insert ---distorted---.

Col. 14, line 36, delete "$A_{Nx3}{}^T$" and insert ---$A^T_{Nx3}$---.

Col. 14, line 43, delete "$\epsilon_3{}^T$" and insert ---$\epsilon^T_3$---.

Col. 14, line 50, delete "$A_{Nx3}{}^T$" and insert ---$A^T_{Nx3}$---.

Col. 14, line 57, delete "$\epsilon_3{}^T$" and insert ---$\epsilon^T_3$---.

Col. 14, line 59, first occurrence, delete "$\epsilon_3{}^T$" and insert ---$\epsilon^T_3$---.

Col. 14, line 64, delete "$\epsilon_3{}^T$" and insert ---$\epsilon^T_3$---.

Col. 15, line 24, first and second occurrence, delete "$\eta_3{}^T$" and insert ---$\eta^T_3$---.

Col. 15, line 18, delete "$Nx3^T$" and insert ---$D^T_{Nx3}$---.

UNITED STATES PATENT AND TRADEMARK OFFICE
CERTIFICATE OF CORRECTION

PATENT NO. : 4,760,596
DATED : July 26, 1988
INVENTOR(S) : Jagannath P. Agrawal and Norman E. Heckman It is certified that error appears in the above—identified patent and that said Letters Patent is hereby corrected as shown below:

Col. 15, line 34, delete "$C_N{}^T$" and insert ---$C_N^T$---.

Col. 15, line 54, delete "shiftregisters" and insert ---shift registers---.

Signed and Sealed this

Tenth Day of January, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,760,596
DATED : July 26, 1988
INVENTOR(S) : Jagannath P. Agrawal and Norman E. Heckman It is certified that error appears in the above—identified patent and that said Letters Patent is hereby corrected as shown below:

Col. 12, line 27 (first occurrence), "$\hat{d}_f(n)$" should be ---$d_f(n)$---.

Col. 12, line 34, "$\hat{d}_f(n)$" should be ---$d_f(n)$---.

Col. 12, line 61, "$\hat{d}_f(n)$" should be ---$d_f(n)$---.

Col. 13, line 17, "$\hat{d}'_f(n)$" should be ---$d'_f(n)$---.

Col. 13, line 18, "$\hat{d}_f(n)$" should be ---$d_f(n)$---.

Col. 13, line 23, "$\hat{d}'_f(n)$" should be ---$d'_f(n)$---.

Col. 14, line 9, "$d_f(n)$" should be ---$\hat{d}_f(n)$---.

Col. 14, line 19, "$d_f(n)$" should be ---$\hat{d}_f(n)$---.

Signed and Sealed this

Twenty-fourth Day of October, 1989

Attest:

DONALD J. QUIGG

Attesting Officer      Commissioner of Patents and Trademarks